United States Patent [19]

Scharf

[11] Patent Number: 4,712,821
[45] Date of Patent: Dec. 15, 1987

[54] GRAIN BOX CLEANOUT DEVICE

[76] Inventor: James E. Scharf, Box 305, Perdue, Saskatchewan, Canada, S0K 3C0

[21] Appl. No.: 947,376

[22] Filed: Dec. 29, 1986

[51] Int. Cl.[4] .......................... E01H 5/02; A62C 1/06; B05B 7/02
[52] U.S. Cl. ........................... 294/19.1; 294/49; 294/55
[58] Field of Search ............... 294/19.1, 55, 49, 56.5, 294/53.5, 51, 56, 57; 15/236 R, 257.1, 257.2; 56/400.05, 400.01, 400.04

[56] References Cited

U.S. PATENT DOCUMENTS 3,069,714 12/1962 Chinn .................................. 294/55
3,773,375 11/1973 Nehls ............................... 294/54.5

FOREIGN PATENT DOCUMENTS 1045763 1/1979 Canada ............................ 294/19.1

Primary Examiner—James B. Marbert
Attorney, Agent, or Firm—Stanley G. Ade; Adrian D. Battison; Murray E. Thrift

[57] ABSTRACT

When dumping grain from a truck box through the tailgate opening, grain lodges in the corners upon each side of the tailgate opening and the operator normally has to stand on the auger or the like in order to reach over the tailgate with a shovel and is therefore at risk due to the danger of slippage with the danger perhaps of coming into contact with the rotating discharge auger assembly. The present device consists of a handle and an arcuately curved rake blade secured at one end with the major portion of the blade extending on one side thereof. This can be engaged within the tailgate opening and reaches into each back corner of the box thus enabling the operator to pull the lodged grain towards the opening readily and easily.

14 Claims, 3 Drawing Figures

GRAIN BOX CLEANOUT DEVICE

BACKGROUND OF THE INVENTION

This invention relates to new and useful improvements in hoe or scraper devices designed particularly for use with dump trunk boxes incorporating a tailgate and a tailgate opening located centrally thereof and adjacent the base.

When such boxes are elevated to the dumping position, grain or the like normally flows out through the opening into an auger hopper whereupon it is augered up into a storage facility or the like.

As the truck box empties, a considerable amount of grain lodges in each rear lower corner of the box and conventionally, the operator stands on the sloping auger tube so that he can reach over the top of the truck box, with a shovel, in order to dislodge such grain.

Considerable danger exists in that the operator may slip from the auger tube. Furthermore, due to the inclination of the auger tube, there is a further danger that one or both feet of the operator may engage within the open rotating pickup portion of the auger assembly.

Also, in order to reach the grain from the upper side of the truck box, the conventional tarpaulin has to be removed at least partially, which further adds to the time required to unload the truck box.

The present invention overcomes difficulties encountered in the cleaning out of truck boxes when dumping grain or the like and which eliminates the necessity of removing the tarpaulin cover either partially or fully.

In accordance with the invention there is provided a hoe or scraper for use in cleaning out grain from the lower rear corners of a dump truck box when in the dump position, said truck box including a substantially centrally located tailgate opening in the base of said tailgate assembly; said hoe or scraper comprising an elongated handle and a scraper blade secured by one end thereof and extending transversely upon at least one side of said handle, said blade being arcuately curved for at least part of the length thereof whereby the distal end of such blade is situated closer to the other end of said handle than the point of attachment of said one end of said handle to said blade, said scraper being engagable through the associated tailgate opening and into either of the rear corners of said truck box.

Another advantage of the invention is that the dislodgining of the grain in the corners is undertaken readily and easily with the operator standing well clear of the rotating pickup portion of the auger assembly.

Another advantage of the invention is to provide a device of the character herewithin described which, due to the formation thereof, assists in engaging the distal end of the blade into the bottom rear corners of the truck box as it is pulled through the grain mass.

Still another advantage of the invention is that it is designed to stand upright upon the blade with the handle extending vertically so that is may be used as a guide when backing the truck towards the auger assembly.

One of the advantages of this invention is the provision of a relatively short straight extension of the blade on the opposite side of the handle which can be used to scrap grain from the box when a relatively small opening is provided.

A still further advantage of the invention is to provide a device which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
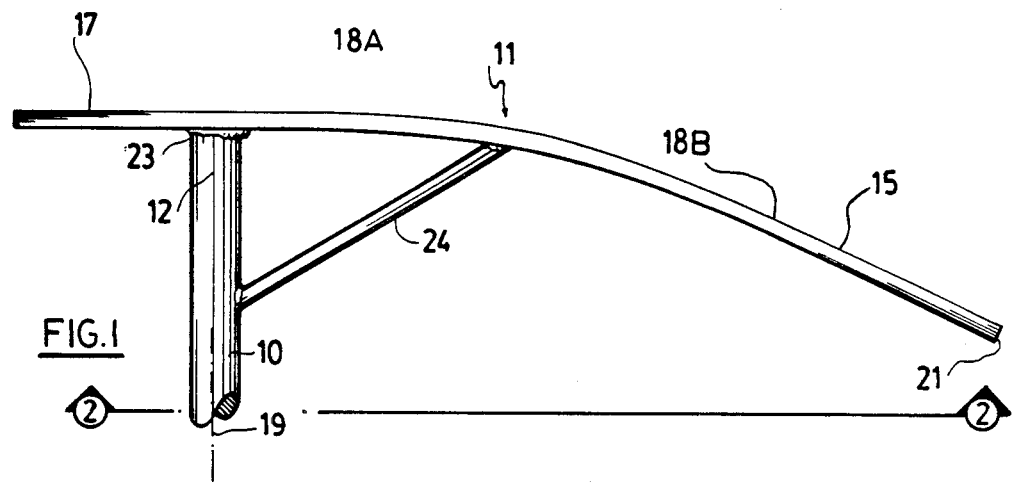
FIG. 1 is a top plan view of the assembly with the handle fragmented.
Figure 2:
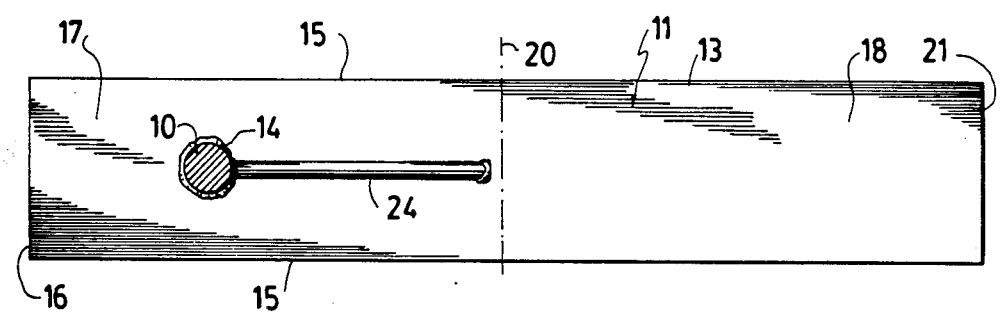
FIG. 2 is a view substantially along the line 2—2 of FIG. 1.

Proceeding therefore to describe the invention in detail, reference to the accompanying drawings will show an elongated handle 10 having a blade collectively designated 11 secured upon one end 12 of the handle as will hereinafter be described.

The blade is formed from a substantially rectangular elongated strip of material 13, preferably sheet metal, and the handle 10 is engaged as by welding 14 to the blade intermediate the upper and lower edges 15 thereof and spaced inwardly from one end 16 thereof thus defining a minor, relatively short portion of the blade 17 and a major, relatively long portion 18 each extending one upon each side of the longitudinal axis 19 of the elongated handle. It will be noted that the transverse axis 20 of the blade is situated perpendicular to the longitudinal axis 19 of the handle.

The minor portion 17 of the blade is straight or non-curved from the end 16, past the attachment to the handle 10 and to a point 18A along the major portion 18 inboard of the diagonal strut 24.

It then acuately curved to approximately point 18B at which time it becomes straight or non-curved from 18B to the end 21. This distal end 21 of this major portion 18 terminates closer to the other end 22 of the handle then the point of attachment 23 of the handle to the blade.

A diagonal brace 24 extends from the handle adjacent end 12 outwardly to the major portion 18 of the blade spaced from the point of attachment 23 in order to provide additional stability to this major portion 18, when in use. A rubber hand grip 25 may be engaged upon the distal end 26 of the handle for ease and comfort in use.

Figure 3:
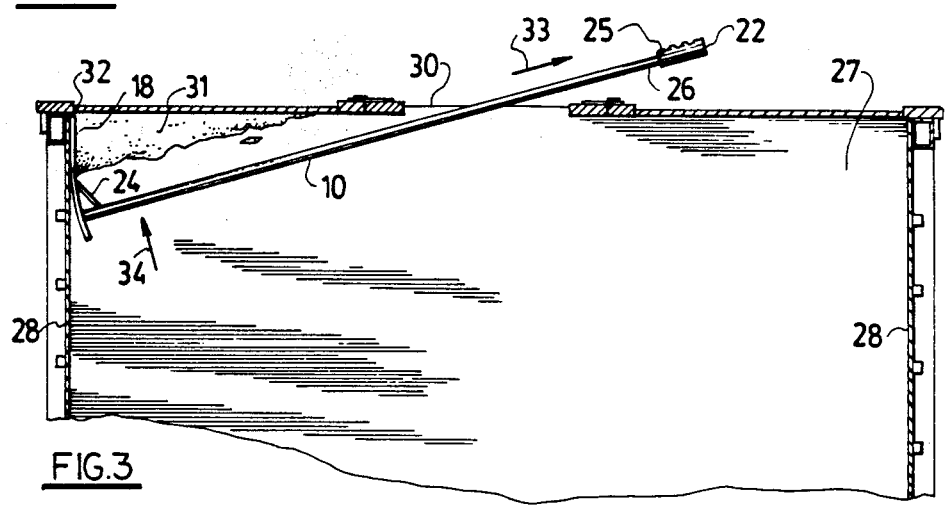
FIG. 3 is a fragmentary top plan view of a truck box sectioned in part and showing the invention in reduced scale engaged within the tailgate opening.

In operation, reference should be made to FIG. 3 which shows the rear end of a truck box collectively designated 26 and including a floor 27, side walls 28 and a tailgate assembly 29 having a tailgate opening 30 situated centrally thereof and adjacent the lower end thereof and through which grain normally flows when the tailgate is opened and the truck elevated.

As the grain discharges, a mass of the grain indicated by reference character 31 lodges within the lower rear corners 32 of the truck and is normally dislodged by means of a shovel as hereinbefore described.

However, with the present device, the blade is engaged through the opening 30 as clearly shown in Figure 3 with the major portion 18 thereof being directed towards the lower corner 32 and upon the floor 27. As it is pulled manually in the direction of arrow 33, the curve of the blade engaging with the grain mass 31 causes the blade to be moved in the direction of arrow 34 thus ensuring engagement within the corner 32 and permitting the grain mass 31 to be pulled towards the opening 30.

The designed weight and offset partially curved blade slides on the bottom of the truck box and cuts into the grain as the handle is pulled enabling the corner to be cleaned out with approximately six strokes.

Furthermore, time is saved because it is not necessary to remove the tarpaulin from the top of the truck box in order to obtain access to the interior thereof in order to clean out these corners.

If the opening 30 of the truck box is narrower than normal, it may not be possible to pull the distal end 21 of the major portion, all the way to the side edge of this opening because the handle binds against the opposites of vertical side edge. Under these circumstances, the blade is flipped over through 180°, within the truck box so that the narrower or minor portion 17 is used to scrap the grain from the corner 32 to the opening 30.

This of course will take more strokes but it does permit the rake to be used in relatively narrow openings 30.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A hoe or scraper for use in cleaning out grain from the lower rear corners of a dump truck box when in the dump position, said truck box including a substantially centrally located tailgate opening in the base of said tailgate assembly; said hoe or scraper comprising an elongated handle and a scraper blade secured by one end thereof and extending transversely upon either side of said handle, said handle being secured to said blade offset from the vertical axis of said blade, thereby defining a minor portion of said blade extending upon one side of said handle and a major portion of said blade extending upon the other side of said handle, said major portion of said blade being arcuately curved for at least part of the length thereof whereby the distal end of of such blade is situated closer to the other end of said handle than the point of attachment of said one end of said handle to said blade, said scraper being engageable through the associated tailgate opening and into either of the rear corners of said truck box.

2. The hoe or scraper according to claim 1 in which said blade is formed from a substantially elongated rectangular flat strip of material secured upon one end of said handle with the transverse axis of said blade being perpendicular to the longitudinal axis of said handle.

3. The hoe or scraper according to claim 1 in which said minor portion of said blade is planar and extends perpendicular from the longitudinal axis of said handle.

4. The hoe or scraper according to claim 1 in which said minor portion of said blade is planar and extends perpendicular from the longitudinal axis of said handle.

5. The hoe or scraper according to claim 1 which includes a brace extending from said handle adjacent said one end thereof, diagonally towards and being secured to said major portion of said blade spaced from the point of attachment of said blade to said one end of said handle.

6. The hoe or scraper according to claim 2, which includes a brace extending from said handle adjacent said one end thereof diagonally towards and being secured to said major portion of said blade and being spaced from the point of attachment of said blade to said one end of said handle.

7. The hoe or scraper according to claim 3 which includes a brace extending from said handle adjacent said one end thereof diagonally towards and being secured to said major portion of said blade and being spaced from the point of attachment of said blade to said one end of said handle.

8. The hoe or scraper according to claim 4 which includes a brace extending from said handle adjacent said one end thereof diagonally towards and being secured to said major portion of said blade and being spaced from the point of attachment of said blade to said one end of said handle.

9. The hoe or scraper according to claim 1 in which said minor portion and the part of the said major portion adjacent to said handle are straight and the longitudinal axis of said minor portion and said part of said major portion lie perpendicular to the longitudinal axis of said handle, either of said major or minor portions being engageable into either of the said rear corners of the associated truck box.

10. The hoe or scraper according to claim 2 in which said minor portion and the part of the said major portion adjacent to said handle are straight and the longitudinal axis of said minor portion and said part of said major portion lie perpendicular to the longitudinal axis of said handle, either of said major or minor portions being engageable into either of the said rear corners of the associated truck box.

11. The hoe or scraper according to claim 3 in which said minor portion and the part of the said major portion adjacent to said handle are straight and the longitudinal axis of said minor portion and said part of said major portion lie perpendicular to the longitudinal axis of said handle, either of said major or minor portions being engageable into either of the said rear corners of the associated truck box.

12. The hoe or scraper according to claim 4 in which said minor portion and the part of the said major portion adjacent to said handle are straight and the longitudinal axis of said minor portion and said part of said major portion lie perpendicular to the longitudinal axis of said handle, either of said major or minor portions being engageable into either of the said rear corners of the associated truck box.

13. The hoe or scraper according to claim 5 in which said minor portion and the part of the said major portion adjacent to said handle are straight and the longitudinal axis of said minor portion and said part of said major portion lie perpendicular to the longitudinal axis of said handle, either of said major or minor portions being engageable into either of the said rear corners of the associated truck box.

14. The hoe or scraper according to claim 6 in which said minor portion and the part of the said major portion adjacent to said handle are straight and the longitudinal axis of said minor portion and said part of said major portion lie perpendicular to the longitudinal axis of said handle, either of said major or minor portions being engageable into either of the said rear corners of the associated truck box.

* * * * *